Patented Sept. 10, 1946

2,407,291

UNITED STATES PATENT OFFICE 2,407,291

PROCESS OF MAKING OLEFINS

William M. Quattlebaum, Jr., Charleston, and Walter J. Toussaint, South Charleston, W. Va., assignors to Carbide and Carbon Chemicals Corporation, a corporation of New York No Drawing. Application September 17, 1942, Serial No. 458,736

12 Claims. (Cl. 260—681)

This invention relates to a process for making olefins, and it particularly pertains to a process for making dienes of the conjugated type represented by butadiene, isoprene and 2-ethyl butadiene. Because of its greater apparent importance, the applicability of the invention to the making of conjugated dienes will be described first, and the more general aspects of the invention will be discussed later.

Because of their ability to polymerize under appropriate conditions, either by themselves, or conjointly with styrene, acrylonitrile and certain other unsaturated compounds, the conjugated diene hydrocarbons are valuable starting materials in the production of durable replacements for rubber. Accordingly, much attention has been devoted over a period of years to the development of processes for making compounds of this type. While some success has been obtained in producing these compounds by the dehydrogenation of butane, the difficulties in removing hydrogen from paraffin hydrocarbons without breaking the carbon chain are well known. Consequently, considerable effort has been directed to the production of conjugated dienes from oxygenated compounds, from which water can be eliminated with the production of olefinic linkages. Oxygenated compounds which have been investigated for this purpose include the butylene glycols, tetrahydrofuran, ketones, substituted dioxanes, unsaturated alcohols, and aldehydes. However, these known processes suffer from the disadvantages that, those materials which give satisfactory yields of diene are not readily available; and, in the case of those reactions where the starting materials are inexpensive, the yields, efficiencies, and operating costs of the processes are such that they do not appear commercially attractive.

In view of the aforesaid state of the art, one of the objects of this invention is to provide a method for making conjugated dienes from materials which are readily available at low cost. Another object is to provide a process which will operate industrially in the production of the dienes from the starting materials at satisfactory efficiencies. A further object is to provide a method which can be put into expanded industrial practice, when warranted by the price or available supply of natural rubber, in a minimum of time without requiring special materials of construction or equipment. Another object is to provide a general synthesis for making olefins.

According to one embodiment of this invention, dienes are prepared by passing the vapors of an alcohol and an unsaturated acyclic aldehyde having at least four carbon atoms over a catalyst comprising silica gel. The mechanism of the reaction which occurs, and the nature of the intermediates formed, if any, have not been definitely established, but the over-all reaction can be regarded as the elimination of oxygen from the enol form of the aldehyde to give a diene hydrocarbon of the same number of carbon atoms, accompanied by dehydrogenation of the alcohol to a carbonyl compound, with the formation of water. If a primary alcohol is involved, the resulting carbonyl compound will be an aldehyde, whereas a secondary alcohol will yield a ketone as the carbonyl compound. This over-all reaction, in the case of the reaction of crotonaldehyde with ethanol may be written as follows:

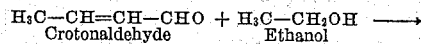

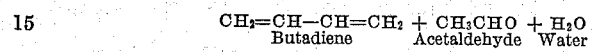

While the invention is not to be restricted by any statement of theory, it seems probable that the crotonaldehyde is adsorbed by the silica gel in the form of its enol silicate,

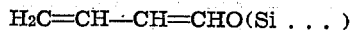

The ethanol may also be adsorbed as a silicate, $H_3C-CH_2O(Si \ldots)$. Silica gel, under the reaction conditions, is not a typical hydrogenation or dehydrogenation catalyst, but transfer of a hydrogen atom from the alcohol silicate to the enol silicate apparently takes place, resulting in the liberation of butadiene, $H_2C=CH-CH=CH_2$, and acetaldehyde, $H_3C-CHO$. During this series of reactions a molecule of water is formed. That the reaction is not dependent on the presence of the olefinic double bond in crotonaldehyde is shown by the fact that n-butyraldehyde and ethanol may be passed over a silica gel catalyst to yield butene-1, acetaldehyde and water, presumably by a similar series of reactions.

By the term "silica gel" is meant a porous, more or less hydrated silica in which the pores are ultramicroscopic and the intrinsic catalytic activity of the silica becomes practically available by virtue of the large surface accessible to gases. A preferred manner of preparation is described in Patrick Patent No. 1,297,724 as modified by the use of a slight excess of acid. Silica gel may be regarded as a porous mass in which said silicon atom is attached to four oxygen atoms, and only the surface is more or less hydrated. Consequently, as indicated above, the reaction may be regarded as taking place on the surface of the catalyst, with the transitory formation of silicate-like products of the alcohol and enol form of the aldehyde with the catalyst surface, which break down yielding the carbonyl compound and the conjugated diene.

Other unsaturated aldehydes which can be reacted with alcohols in the process of this invention to yield diene hydrocarbons include alpha-methyl crotonaldehyde, alpha-ethyl crotonaldehyde, and hexadienal. Instead of the unsaturated aldehydes themselves, compounds capable of yielding them, such as aldols and alkoxy aldehydes, can be used, and it is understood that the term "unsaturated" or "mono-olefinic acyclic aldehyde having at least four carbon atoms," as used in this description and in the appended claims, includes such aldehydes irrespective of whether they are initially introduced in the reaction zone or are formed in the reaction. As an illustration of the use of materials giving rise to unsaturated aldehydes in the reaction, ethoxybutyraldehyde has been converted to butadiene in the presence of ethanol, the ethoxybutyraldehyde being presumably decomposed to ethanol and crotonaldehyde in the reaction. As the other reactant, any alcohol capable of dehydrogenation to a carbonyl compound can be employed. Suitable alcohols from the viewpoint of availability and cost include methanol, ethanol, isopropanol, and butanol.

In addition to the principal reaction as stated above, side reactions occur to a limited extent, and small amounts of mono-olefins having the same number of carbon atoms as the unsaturated aldehyde introduced, as well as other materials are present in the reaction products. In the formation of butadiene from crotonaldehyde, small amounts of crotyl alcohol are formed, indicating that this substance may, to a certain extent, be an intermediate.

The silica gel catalyst employed in this invention is far more effective than other catalysts, as far as is known, in producing dienes, which are readily recovered in a high state of purity and in good yields. It is to be distinguished from the catalysts employed by the prior art, particularly alumina or precipitated aluminum hydroxide, in that yields of conjugated dienes ranging from 40% to 60%, based on the aldehyde introduced, and efficiencies of 60% to 90%, based on the aldehyde consumed, are typical of the results obtainable with silica gel catalysts, whereas known catalysts, such as precipitated aluminum hydroxide, are reported as giving yields of only 17.5% to 25% of butadiene when aldol and alcohol are passed over them. The principal defect of other known catalysts, notably alumina, which is not encountered with silica gel, is that they produce relatively large amounts of mono-olefins corresponding to the unsaturated aldehyde employed. These mono-olefins usually have comparatively little value and are difficult to separate from the diene.

The purity of the conjugated diene produced in the presence of silica gel may be appreciably increased by preliminary digestion of the commercial gel with nitric acid to remove traces of impurities. Such treatment results in a catalyst which, in experiments on the reaction of crotonaldehyde with ethanol, produces butadiene containing as little as 1% to 2% butylene.

Fouling of the catalysts with carbonaceous deposits may occur in practice, resulting in a gradual diminution of the activity of the catalyst. The activity of the catalysts can be restored by burning them with air containing oxides of nitrogen or nitric acid at temperatures of about 350° C. to 400° C. for about 6 to 12 hours. Treatment with air alone can also be used to burn off these deposits, but a longer period of time or a higher temperature is then required.

If desired, the silica gel can be blended with an inactive material as a support. Also its activity can be increased by the addition of small amounts of catalytically active metal oxides. In general, however, the use of pure silica gel is preferred, for the reason that silica gel promoted with such oxides usually tends to promote the formation of considerable amounts of mono-olefins along with the diene, or the formation of tarry by-products. Thus, commercial silica gel usually tends to produce more mono-olefin in the reaction than does the same gel after treatment with nitric acid, probably because the acid removes traces of aluminum and iron compounds.

The deoxygenation of the unsaturated aldehydes to conjugated dienes in the presence of primary or secondary alcohols may take place over a wide range of temperatures, and convenient operating temperatures are between 200° C. and 500° C. Temperatures within the range of 275° C. to 450° C. are preferred. When secondary alcohols are employed, somewhat lower temperatures are preferred than those specified above. For instance, isopropanol is active in converting crotonaldehyde to butadiene over a silica gel catalyst at a temperature of 225° C. However, the use of primary saturated alcohols having one-half as many carbon atoms as the unsaturated aldehyde employed is preferred. This is because the alcohol is transformed into a saturated aldehyde in the reaction, and this aldehyde can be recovered and converted by the aldol condensation and subsequent dehydration of the aldol to an unsaturated aldehyde for use in the reaction. Varying ratios of unsaturated aldehyde to alcohol are suitable, although best results are obtained with an excess of the alcohol. Molar ratios of alcohol to aldehyde ranging from 2:1 to 8:1 have been found to be preferable. The time of contact of the reactants with the catalyst is not critical, so far as is known, and may be varied widely.

Characteristics of the present invention which make it expedient for rapid industrial expansion when justified by the price or available supply of natural rubber, are that it is preferably carried out at atmospheric pressure, although increased or reduced pressures may be employed, and that both the reactants and catalysts employed are readily obtainable and non-corrosive. As a consequence of this latter feature, the reaction may be carried out in ordinary steel tubes containing the catalyst and having a convenient means of controlling the temperature. The vaporizers required are standard equipment, and the separation of the reaction products presents no difficulties. This separation may be accomplished by fractional condensation wherein the normally liquid products are condensed in a water cooled condenser, the normally gaseous conjugated dienes are condensed in a brine cooled condenser, and the low boiling "permanent" gases are recovered uncondensed. Pressure condensation may also be employed to condense the diene fraction. The distillation of the normally liquid products of reaction is not complex and involves the separation of the excess alcohol and unreacted aldehyde for recycling, the recovery of the saturated aldehyde formed in the reaction, and the removal of water and high-boiling residues.

While the invention has been particularly described with reference to the production of conjugated dienes, the reaction is applicable to the formation of other unsaturated hydrocarbons from carbonyl compounds capable of keto-enol tautomerism, by deoxygenation with primary or secondary alcohols. Thus, as noted previously, butyraldehyde and ethanol can be passed over the catalyst to yield butylene, acetaldehyde and water. Similarly, acetophenone and ethanol have been passed over silica gel to yield styrene, acetaldehyde, and water. In all such processes, it is probable that the mechanism of the reaction is similar to that described for the reaction of crotonaldehyde and ethanol.

The examples to follow will illustrate the practice of this invention.

Example 1

Silica gel as obtained commercially was treated to prevent spalling on contact with liquids, by placing the gel in a stream of humidified air until the gel was saturated. The gel was then digested with a mixture of nitric acid and water in equal parts by weight at a temperature of 80° C. The gel was washed nearly free of acid, dried, and installed in a vertical, jacketed, stainless steel tube, one inch in diameter. The jacket contained a high-boiling organic liquid, and heat was supplied electrically through a resistance winding on the jacket.

Two hundred and fifty (250) c. c. of a mixture of crotonaldehyde and ethanol, in the ratio of two mols of alcohol to one of aldehyde, containing about 8 to 9% water, were passed at 365° C. over the silica gel catalyst which had been treated with nitric acid. Based on the crotonaldehyde, a 52% yield of butadiene was obtained, in which acetaldehyde, carried over azeotropically, was the chief impurity. The molar ratio of acetaldehyde to butadiene produced in the run was 0.72 to 1. In an experiment under otherwise similar conditions, but in which the silica gel was not digested with acid, a 41% yield of butadiene, in association with other hydrocarbons, was obtained.

Example 2

Further experiments employing the same catalyst as used in the preceding example were carried out in a similar manner. At a temperature of 425° C., the yield of butadiene was 56%. A further increase in temperature to 435° C. was not beneficial, the yield being 49%, and increased amounts of by-products were noted. In a fourth run over the same catalyst at 362° C., the catalyst had lost some of its activity, the yield of butadiene being 27%.

The catalyst was then reactivated by passing a stream of air containing nitric acid over the catalyst for a period of several hours at a temperature of 350° to 400° C., at a rate of flow of about 30 liters per hour per liter of catalyst. In a run conducted at 370° C. over the reactivated catalyst, the yield of butadiene was 45%.

Example 3

Silica gel was treated as described in Example 1, with the exception that two digestions with nitric acid were carried out. Under conditions otherwise similar to those described in the preceding examples, this catalyst, in two trials, effected a 64% yield of butadiene in both instances at temperatures of 360° and 365° C. respectively.

Example 4

A mixture of 120 grams of acetophenone and 203 grams of ethanol (91%) was passed through 300 c. c. of purified silica gel in 4.5 hours. The reaction temperature was 350° C. The product was distilled with water, and somewhat more than 30 grams of styrene were obtained.

Example 5

Mixtures of 2-ethyl crotonaldehyde with ethanol on the one hand, and isopropanol on the other, in which the molar ratio of alcohol to aldehyde was 3 to 1 in both instances, were passed over a purified silica gel catalyst at 350° C. Substantial yields of conjugated dienes having the same number of carbon atoms as the aldehyde introduced were obtained in both instances.

Example 6

An apparatus for producing butadiene on a larger experimental scale was constructed consisting essentially of a converter and a still for recovery of the reaction products. The converter consisted of a vertical, jacketed, stainless steel tube, 24 feet long, and 2 inches inside diameter, heated by an organic liquid boiling under pressure. The catalyst bed was 18 feet deep and was supported by a three foot layer of porcelain saddles. Vaporized reactants were introduced at the top of the tube, and the reaction products were removed at the bottom.

The still consisted of a six inch diameter, 22-tray bubble cap column connected to a kettle, and equipped with a dephlegmator, condenser and cold trap in series. Reflux was supplied from the dephlegmator and returned to the top of the column. The reaction products from the converter were fed into the column on the twelfth tray from the kettle. Most of the ethanol and crotonaldehyde and some water were removed from the bottom of the column while butadiene and acetaldehyde were distilled over and condensed in the condenser and cold trap. Water, oils and tar, and the remainder of the ethanol and crotonaldehyde collected in the kettle.

A silica gel catalyst was prepared by digesting 18 liters of the gel with a mixture of equal parts of nitric acid and water at 80° C. After 12 hours heating, the acid was drawn off. The gel was rinsed once with distilled water and then heated for an additional 12 hours with fresh acid, after which it was washed with distilled water until nearly free of acid. Fifteen liters of catalyst thus prepared were heated on a steam bath to remove moisture and then heated in a stream of air at 350° C. in the reaction tube.

A vaporous mixture of ethanol and crotonaldehyde in the molar ratio of 6 to 1, containing about 8 to 9% water and a small amount of acetaldehyde, was converted to acetaldehyde and butadiene in the apparatus described above, the pressure being just sufficient to force the material through the system. The results are tabulated below:

| Material, lbs. | In | Out |
|---|---|---|
| Ethanol | 92.5 | 170.2 |
| Crotonaldehyde | 49.1 | 18.7 |
| Acetaldehyde | 1.4 | 18.7 |
| Butadiene | 0.0 | 17.8 |
| Oil (B. P. 95°–100° C.) | 0.0 | 0.3 |
| Tar | 0.0 | 0.9 |
| Temperature, °C | 365–370 | |
| Feed-rate, gal./hr. | 1.46 | |
| Duration, hrs. | 25.9 | |
| Production ratio, lbs. of butadiene per cu. ft. of catalyst per hour | 1.60 | |
| Yield from crotonaldehyde to butadiene (percent of theoretical) | 47.2 | |
| Efficiency (percent crotonaldehyde to butadiene of total crotonaldehyde consumed) | 75.5 | |
| Yield from ethanol to acetaldehyde (percent ethanol to acetaldehyde of total ethanol introduced) | [1] 9.6 | |
| Efficiency (percent ethanol to acetaldehyde of total ethanol consumed) | 81.5 | |

[1] The yield on this basis is low because of the excess alcohol introduced over that theoretically required.

Other modifications of the invention other than as shown in the foregoing examples are included within the scope of the invention.

We claim:

1. Process for making an olefin which comprises passing a vaporous mixture of a carbonyl compound capable of keto-enol tautomerism and an alcohol capable of dehydrogenation to a carbonyl compound, over a silica gel catalyst, and recovering an olefin from the reaction products.

2. Process for making a diene which comprises passing a vaporous mixture of a mono-olefinic acyclic aldehyde having at least four carbon atoms and an alcohol capable of dehydrogenation to a carbonyl compound, over a silica gel catalyst, and recovering a diene from the reaction products.

3. Process for making a diene which comprises passing a vaporous mixture of a mono-olefinic acyclic aldehyde having at least four carbon atoms and an alcohol capable of dehydrogenation to a carbonyl compound, over a silica gel catalyst, and recovering from the reaction products a diene and a carbonyl compound corresponding to the dehydrogenation product of said alcohol.

4. Process for making a diene which comprises passing a vaporous mixture of an alpha, beta-mono-olefinic acyclic aldehyde having an even number of carbon atoms which is at least four and a primary saturated alcohol having one-half the number of carbon atoms as said aldehyde over a silica gel catalyst, and recovering from the reaction products a diene and an aldehyde corresponding to the dehydrogenation product of said alcohol.

5. Process for making a conjugated diene which comprises passing a vaporous mixture of an alpha, beta-mono-olefinic-acyclic aldehyde having at least four carbon atoms and an alcohol capable of dehydrogenation to a carbonyl compound over a silica gel catalyst at a temperature of 200° to 500° C., and recovering a conjugated diene from the reaction products.

6. Process for making butadiene which comprises passing a vaporous mixture of crotonaldehyde and ethanol over a silica gel catalyst at a temperature of 275° to 450° C., and recovering butadiene and acetaldehyde from the reaction products.

7. Process for making a conjugated diene which comprises passing over a silica gel catalyst at a temperature of 200° to 500° C., a vaporous mixture of an alpha, beta-mono-olefinic-acyclic aldehyde having at least four carbon atoms and a greater molar quantity than said aldehyde of an alcohol capable of dehydrogenation to a carbonyl compound, and recovering a conjugated diene from the reaction products.

8. Process for making butadiene which comprises passing a vaporous mixture of ethanol and crotonaldehyde in the molar ratio between 2:1 and 8:1 over a silica gel catalyst at a temperature of 275° to 450° C., and recovering butadiene and acetaldehyde from the reaction products.

9. Process for making a conjugated diene which comprises passing a vaporous mixture of an alpha, beta-mono-olefinic-acyclic aldehyde having at least four carbon atoms and an alcohol capable of dehydrogenation to a carbonyl compound at a temperature of 200° to 500° C., over a silica gel catalyst which has been digested with an aqueous solution of nitric acid, and recovering a conjugated diene from the reaction products.

10. Process for making butadiene which comprises passing a vaporous mixture of crotonaldehyde and ethanol at a temperature of 200° to 500° C., over a silica gel catalyst which has been digested with nitric acid, and recovering butadiene and acetaldehyde from the reaction products.

11. Process for making a conjugated diene which comprises passing a vaporous mixture of an alpha, beta-mono-olefinic-acyclic aldehyde having at least four carbon atoms and an alcohol capable of dehydrogenation to a carbonyl compound at a temperature of 200° to 500° C., over a silica gel catalyst which has been activated in a heated stream of air containing an oxide of nitrogen, and recovering a conjugated diene from the reaction products.

12. Process for making butadiene which comprises passing a vaporous mixture of crotonaldehyde and ethanol at a temperature of 200° to 500° C., over a silica gel catalyst which has been activated in a heated stream of air containing an oxide of nitrogen, and recovering butadiene and acetaldehyde from the reaction products.

WILLIAM M. QUATTLEBAUM, Jr.
WALTER J. TOUSSAINT.